US007421243B2

(12) United States Patent
Sato et al.

(10) Patent No.: US 7,421,243 B2
(45) Date of Patent: Sep. 2, 2008

(54) METHOD FOR PLAYBACK OF STORED OR BROADCAST CONTENT BASED ON PREDICTED LOCATION AND/OR ATTRIBUTES

(75) Inventors: Junichi Sato, Machida (JP); Takao Yamaguchi, Kokubunji (JP); Tomoaki Itoh, Kawasaki (JP); Ichiro Takei, Tokyo (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 643 days.

(21) Appl. No.: 10/523,724

(22) PCT Filed: Nov. 20, 2003

(86) PCT No.: PCT/JP03/14777

§ 371 (c)(1),
(2), (4) Date: Feb. 7, 2005

(87) PCT Pub. No.: WO2004/049703

PCT Pub. Date: Jun. 10, 2004

(65) Prior Publication Data

US 2006/0156356 A1    Jul. 13, 2006

(30) Foreign Application Priority Data

Nov. 25, 2002   (JP)   ............................. 2002-341099
Nov. 17, 2003   (JP)   ............................. 2003-386409

(51) Int. Cl.
*H04Q 7/20*    (2006.01)
*H04Q 7/32*    (2006.01)

(52) U.S. Cl. .................. 455/3.01; 455/3.02; 455/456.1; 455/422.1; 455/456.3; 455/456.6; 701/200; 701/206; 701/207; 701/213; 342/357.06; 342/357.01; 342/357.08

(58) Field of Classification Search .............. 455/456.3, 455/3.01, 3.02, 3.03, 422.1, 414.1, 414.2, 455/414.3, 403, 456.1–457, 500, 517, 344, 455/550.1, 432.1, 445, 404.1, 404.2, 575.1, 455/90.3; 701/200, 206, 207, 213; 342/357.06, 342/357.01, 357.08, 357.12
See application file for complete search history.

(56) References Cited

U.S. PATENT DOCUMENTS 5,734,780 A * 3/1998 Ichiura et al. ................. 386/46
(Continued)

FOREIGN PATENT DOCUMENTS

JP       8-32478        2/1996
(Continued)

OTHER PUBLICATIONS

English Language abstract of JP-8-32478.
(Continued)

*Primary Examiner*—Keith T Ferguson
(74) *Attorney, Agent, or Firm*—Greenblum & Bernstein, P.L.C.

(57) ABSTRACT

An apparatus includes a storage section that stores stored content, a content receiving section that receives content, a received content storage section that stores received content, and a playback section that plays back the stored content or the received content. A playback control section controls the playback section to switch between playing back the stored content and playing back the received content. A content list management section manages a content list that stores combinations of an address of content relating to a location within a predetermined area, and the location. A location detection section detects current location information and a received content determination section determines content that should be received from the content list based on the current location information. The content receiving section receives content relating to a current location determined by the received content determination section and the playback control section controls the playback section to switch between playing back the received content and playing back the stored content.

12 Claims, 14 Drawing Sheets

100

U.S. PATENT DOCUMENTS

| | | | |
|---|---|---|---|
| 6,456,234 B1 * | 9/2002 | Johnson | 342/357.09 |
| 2002/0055340 A1 | 5/2002 | Seto et al. | |
| 2002/0092019 A1 * | 7/2002 | Marcus | 725/37 |
| 2003/0066078 A1 | 4/2003 | Bjorgan et al. | |
| 2006/0015904 A1 | 1/2006 | Marcus | |

FOREIGN PATENT DOCUMENTS

| | | |
|---|---|---|
| JP | 10-294674 | 11/1998 |
| JP | 11-248484 | 9/1999 |
| JP | 11-339451 | 12/1999 |
| JP | 2001-111921 | 4/2001 |
| JP | 2002-032375 | 1/2002 |
| JP | 2002-152067 | 5/2002 |
| JP | 2002-304349 | 10/2002 |
| WO | 02/086664 | 10/2002 |

OTHER PUBLICATIONS

English Language abstract of JP-11-339451.
English Language abstract of JP-10-294674.
English Language abstract of JP-2002-152067.
English Language abstract of JP-11-248484.
English Language abstract of JP-2001-111921.
English Language abstract of JP2002-304349.

* cited by examiner

| ADDRESS 201 | LOCATION 202 |
|---|---|
| http://www.sample1.com/index.html | N34. 44. 26. 8E135. 34. 22. 6 |
| http://www.sample2.org/index.html | N35. 39. 26. 5E139. 45. 17. 9 |
| .. | .. |

CONTENT 1, CONTENT 2

```
<content>
  <url>http://www.sample1.com/index.html</url>    ~211
  <location>N34.44.26.8E135.34.22.6</location>    ~212
</content>
```
CONTENT 1

```
<content>
  <url>http://www.sample2.org/index.html</url>
  <location>N35.39.26.5E139.45.17.9</location>
</content>
```
CONTENT 2

| ADDRESS | LOCATION | KEYWORDS |
|---|---|---|
| 201 | 202 | 901 |
| http://www.sample1.com/index.html | N34. 44. 26. 8E135. 34. 22. 6 | Italian restaurant |
| http://www.sample2.org/index.html | N35. 39. 26. 5E139. 45. 17. 9 | Sports goods |
| .. | .. | .. |

CONTENT 1, CONTENT 2

FIG. 9

| DATE & TIME 1101 | CATEGORY 1102 | KEYWORDS 1103 | ACTUAL DATA 1104 |
|---|---|---|---|
| '02.11.17.14:00 | Audio | ○○store,coupon | Audio data |
| '02.11.17.16:00 | Audio | Restaurant | Audio data |
| '02.11.18.13:00 | Aodio+Text | ××restaurant | Audio data, text data |
| '02.11.19. 9:00 | Text | △store,coupon | Text data |
| ... | ... | ... | ... |

FIG.11

METHOD FOR PLAYBACK OF STORED OR BROADCAST CONTENT BASED ON PREDICTED LOCATION AND/OR ATTRIBUTES

TECHNICAL FIELD

The present invention relates to a terminal apparatus and information playback method that play back content received by means of broadcasting or communication.

BACKGROUND ART

Heretofore, a terminal apparatus has been developed that plays back different content according to attribute information (for example, Unexamined Japanese Patent Publication No. 2001-111921). With this terminal apparatus, the contents of broadcast commercials are managed as attribute information, and commercials relevant to the interests of a viewer are stored. Then, when a TV program is viewed, commercials that have attributes relevant to the interests of the viewer are substituted for commercial broadcasting portions and played back.

However, with the above-described kind of terminal apparatus, when a broadcast TV program is received and played back, stored information such as a commercial relevant to the interests of a user is substituted and played back. Therefore, when music, video, or other content stored in a storage medium such as a compact disc (hereinafter referred to as "CD"), hard disk, DVD, or memory is being played back, only that content can be played back, and information other than that content cannot be played back. There is thus a problem in that, when viewing content stored in a storage medium, a user cannot view information other than that content.

Also, when the above-described kind of terminal apparatus is used as a mobile terminal, there is a problem in that it may not be possible to receive information such as commercials, or there may be periods during which a program cannot be played back, due to the TV program reception area or the radio wave conditions thereof.

DISCLOSURE OF INVENTION

It is an object of the present invention to make possible playback of both content stored in a storage medium and content received by means of broadcasting or communication, and to enable both contents to be played back without interruption of content.

The present invention is configured so that a terminal apparatus receives content by means of broadcasting or communication, and switches between playback of stored content stored in a storage medium and playback of this received content based on at least one of stored content playback conditions and broadcast or communication content reception conditions.

By this means, it becomes possible to reference content received by a terminal apparatus even when stored content is viewed, enabling a user to view not only stored content but also content received by a terminal apparatus—for example, content such as commercials of the region in which the terminal apparatus is present—simultaneously. Also, when a terminal apparatus cannot receive content, content stored in a storage medium can be played back.

BRIEF DESCRIPTION OF DRAWINGS

FIG. 2 is drawing showing the data structure of a content list;

FIG. 3 is a drawing showing an example in which the content list shown in FIG. 2 is represented by means of XML;

FIG. 9 is drawing showing an example of the data structure of a content list managed by a content list management section of a terminal apparatus according to Embodiment 2;

FIG. 11 is drawing showing an example of received content stored in a received content storage section of a terminal apparatus according to Embodiment 3;

BEST MODE FOR CARRYING OUT THE INVENTION

Embodiment 1

Figure 1:
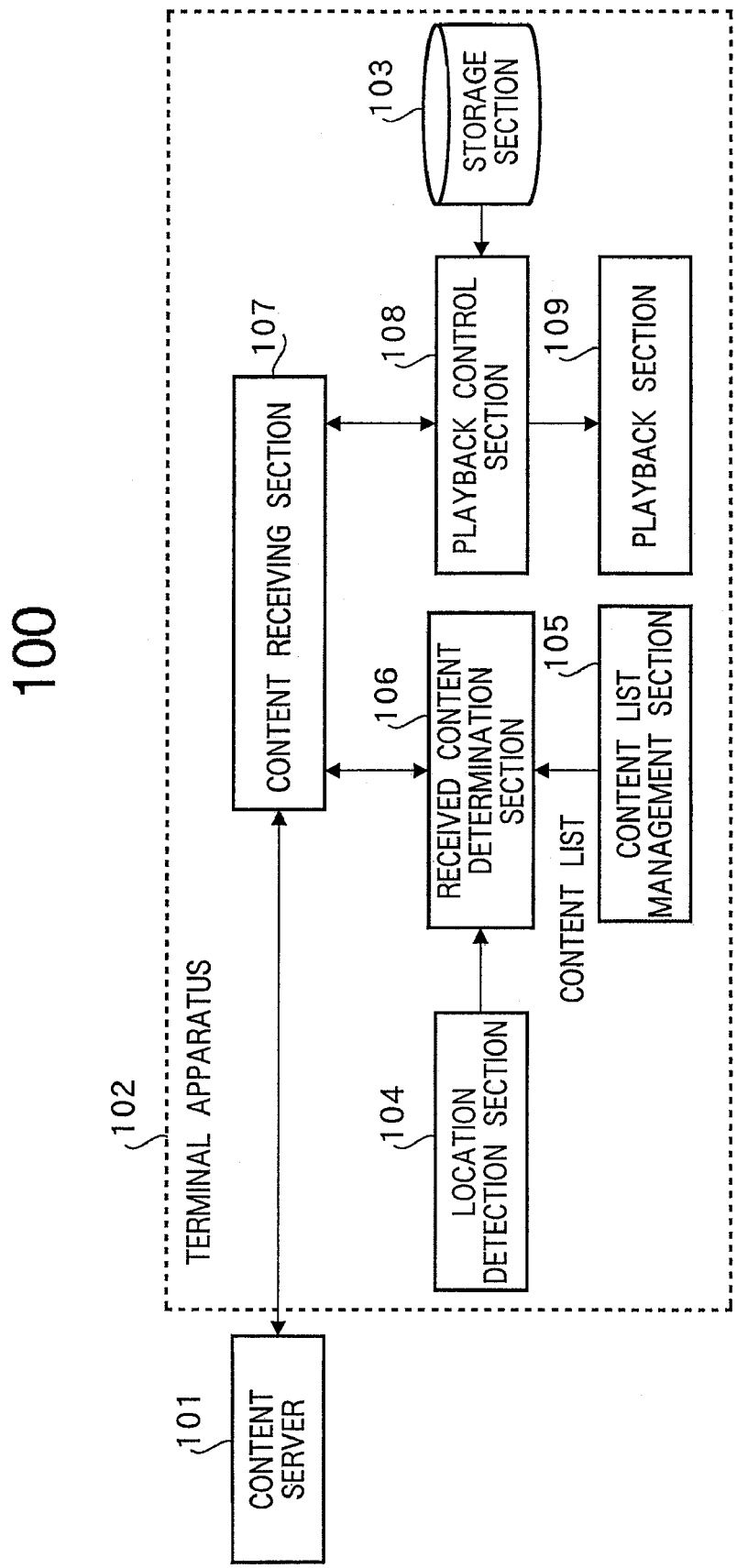
FIG. 1 is a configuration diagram of an information playback system equipped with a terminal apparatus according to Embodiment 1 of the present invention.

An information playback system equipped with a terminal apparatus according to Embodiment 1 of the present invention will now be described. First, the configuration of an information playback system equipped with a terminal apparatus according to Embodiment 1 will be described using FIG. 1. FIG. 1 is a configuration diagram of an information playback system equipped with a terminal apparatus according to Embodiment 1 of the present invention.

An information playback system 100 has a content server 101 that distributes content related to a location (hereinafter referred to as "location-related content") to a mobile terminal apparatus, and a terminal apparatus 102 that receives this location-related content.

Terminal apparatus 102 has a storage section 103. Storage section 103 stores stored content. Stored content includes, for example, digitally recorded music data, text data, image data, and video data. These stored contents may be obtained not only by being stored beforehand, but also by being copied from another storage medium, or by being received by means of communication or broadcasting. Storage section 103 is not limited to a magnetic disk or semiconductor memory provided in terminal apparatus 102, but may be a CD holding music data, CD-ROM, DVD, or other memory. In the following description, a case is described in which a CD is used for storage section 103.

Terminal apparatus 102 also has a location detection section 104. Location detection section 104 detects the current location of terminal apparatus 102. GPS (Global Positioning System), for example, may be used for location detection section 104. Location detection section 104 also detects the direction of movement and speed of movement as well as the current location of terminal apparatus 102.

Terminal apparatus 102 also has a content list management section 105. Content list management section 105 manages a content list, which is a list of location-related content. A content list may be recorded in memory such as CD-ROM or a DVD, or may be received from an external server using any means of communication and stored on a magnetic disk or in semiconductor memory.

Here, an example of the data structure of a content list will be described using FIG. 2. As shown in FIG. 2, a content list holds a plurality of pairs comprising a location-related content address 201 and a geographical location information 202 corresponding to the location-related content. In the example in FIG. 2, data relating to two contents, location-related content 1 (content 1) and location-related content 2 (content 2) are listed.

Address 201 is the URL of location-related content. Location information 202 is represented by latitude and longitude. The modes of representation of address 201 and location information 202 are not limited to these.

FIG. 3 is a drawing showing an example in which the content list shown in FIG. 2 is represented by means of XML (eXtensible Markup Language).

Information relating to location-related content in the part enclosed by <content> and </content>. Specifically, information relating to location-related content is composed of an address 211 enclosed by <url> and </url>, and location information 212 enclosed by <location> and </location>.

XML is a language whose specifications have been established by the World Wide Web Consortium.

To return to the description of terminal apparatus 102 using FIG. 1, terminal apparatus 102 has a received content determination section 106. Based on current location information detected by location detection section 104, received content determination section 106 determines location-related content that should be received at that current location from content list management section 105.

Location-related content that should be received should preferably be of the same kind as stored content. That is to say, it is desirable for location-related content that is received to be music data when stored content is music data, and for location-related content that is received to be video data when stored content is video data. Content that should be received is all information relating to a location, and advertising information concerning a particular facility at a particular location, or an event being held at a particular location, is assumed.

Terminal apparatus 102 also has a content receiving section 107. Content receiving section 107 receives location-related content determined by received content determination section 106 from content server 101. When location-related content is received from content server 101, radio communication by means of a mobile phone, radio LAN, or the like may be used, or Ethernet (R) or similar wire communication may be used.

Terminal apparatus 102 also has a playback control section 108. Playback control section 108 controls a playback section 109, and switches between playback of stored content stored in storage section 103 and playback of location-related content received by content receiving section 107 (hereinafter referred to as "received content"). In this embodiment, a case is particularly described in which received content is played back during intervals in stored content as a concrete example of switching between and playing back stored content and received content. Instead of playing back received content, a signal indicating that location-related content has been received may be played back by playback section 109.

Playback section 109 plays back stored content and received content under the control of playback control section 108. Playback section 109 is composed of a display that displays video and a speaker that outputs audio, for example.

The operations whereby stored content and received content are played back by a terminal apparatus 102 that has the above configuration will now be described. It is here assumed that the user of terminal apparatus 102 is moving while listening to music data stored on a CD as storage section 103. Here, the description refers to music data, but this is not a limitation, and it goes without saying that application is also possible to a case where video data is viewed.

Playback control section 108 sequentially reads music data stored in storage section 103, and plays back that music data via playback section 109. Meanwhile, location detection section 104 detects the current location of this terminal apparatus 102, and passes this information to received content determination section 106. Based on the received current location information, received content determination section 106 determines from content list management section 105 the location-related content that should be received at that current location, and notifies content receiving section 107 of the result.

Content receiving section 107 receives this notification and receives that location-related content from content server 101. Content receiving section 107 then outputs this received content to playback control section 108. On receiving the received content from content receiving section 107, playback control section 108 plays back that received content in playback section 109 in intervals during stored content playback.

Figure 4:
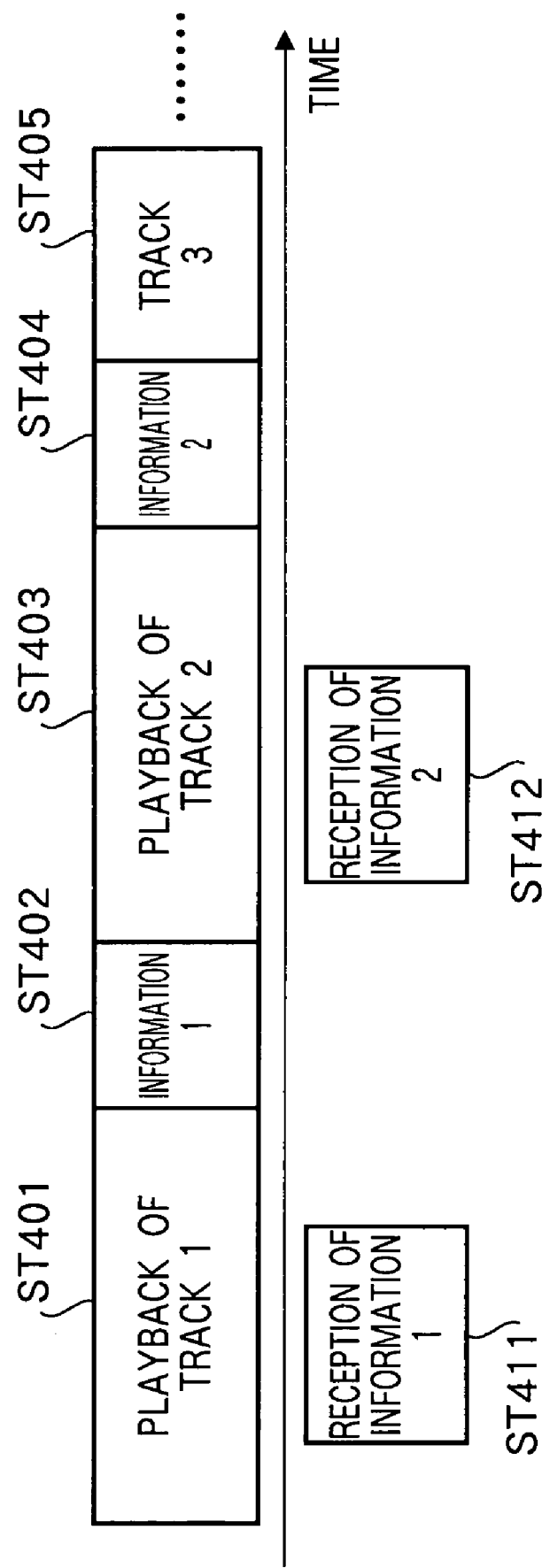
FIG. 4 is a drawing showing an example of the playback procedure for stored content and received content in a terminal apparatus according to Embodiment 1.

An example of the stored content and received content playback procedure in this terminal apparatus 102 will be described using FIG. 4. FIG. 4 is a drawing showing an example of the playback procedure for stored content and received content in this terminal apparatus 102.

In the example shown in FIG. 4, this terminal apparatus 102 first plays back music data 1 (track 1) stored in storage section 103 by means of playback section 109 (ST401). While track 1 is being played back, content receiving section 107 receives location-related content determined by received content determination section 106 based on the current location detected by location detection section 104 as information 1 (ST411). This information 1 is played back by playback section 109 after playback of track 1 ends (ST402).

When playback of information 1 ends, music data 2 (track 2) stored in storage section 103 is then played back (ST403). While track 2 is being played back, information 2 is received using the same kind of procedure as for reception of information 1 (ST412). Then, when playback of track 2 ends, this information 2 is played back (ST404). After playback of this information 2 ends, track 3 is played back in the same way (ST405). Thereafter, stored content and received content are played back alternately in the same way.

Here, an example has been described in which only one received content is played back during intervals in music data. However, this is not a limitation, and it is also possible to switch freely between playback of stored content and received content, such as by playing back a plurality of received contents or by playing back in accordance with the instructions of a viewer/listener. By enabling received content playback to be changed arbitrarily in this way, it is possible to provide a terminal apparatus 102 of greater utility to the user.

Also, as a concrete example of playback switching between stored content and receive data, a case has been described here in which received content is played back during intervals in stored content. However, a method is also possible whereby, conversely, received content is played back, and a switch is made to stored content playback when there is no more received content to be played back. In this case, by switching to stored content playback when the content reception environment, such as the radio wave situation, is poor, or when location-related content that should be displayed cannot be determined, it is possible to supplement received content playback with stored content playback in circumstances in which received content cannot be played back.

In the above description, a case has been described in which received content is played back directly in the form in which it is received. However, this is not a limitation, and it is also possible to play back part of received content, or to output a buzzer tone, text information, or the like, indicating the existence of received content. By enabling the contents of received content to be changed as necessary in this way, it is possible to provide a terminal apparatus 102 of greater utility to the user.

Thus, according to terminal apparatus 102 of this embodiment, playback control section 108 switches between stored content stored in storage section 103 and content received by content receiving section 107 based on at least one of stored content playback conditions and content receiving section 107 content reception conditions, for playback by playback section 109. By this means, it is possible for a user not only to view/listen to stored content, but also simultaneously to view/listen to content received by content receiving section 107. As a result, it is possible to view/listen to content received by terminal apparatus 102 in intervals during viewing/listening to stored content.

In particular, according to terminal apparatus 102 of this embodiment, playback control section 108 plays back stored content stored in storage section 103 by means of playback section 109 on the one hand, and during intervals in that stored content, plays back received content received by content receiving section 107 in accordance with information on the current location of terminal apparatus 102. By this means, a user can, while viewing/listening to stored content selected by the user himself or herself, view/listen to location-related content relating to the area around the current location during intervals in that stored content.

Figure 5:
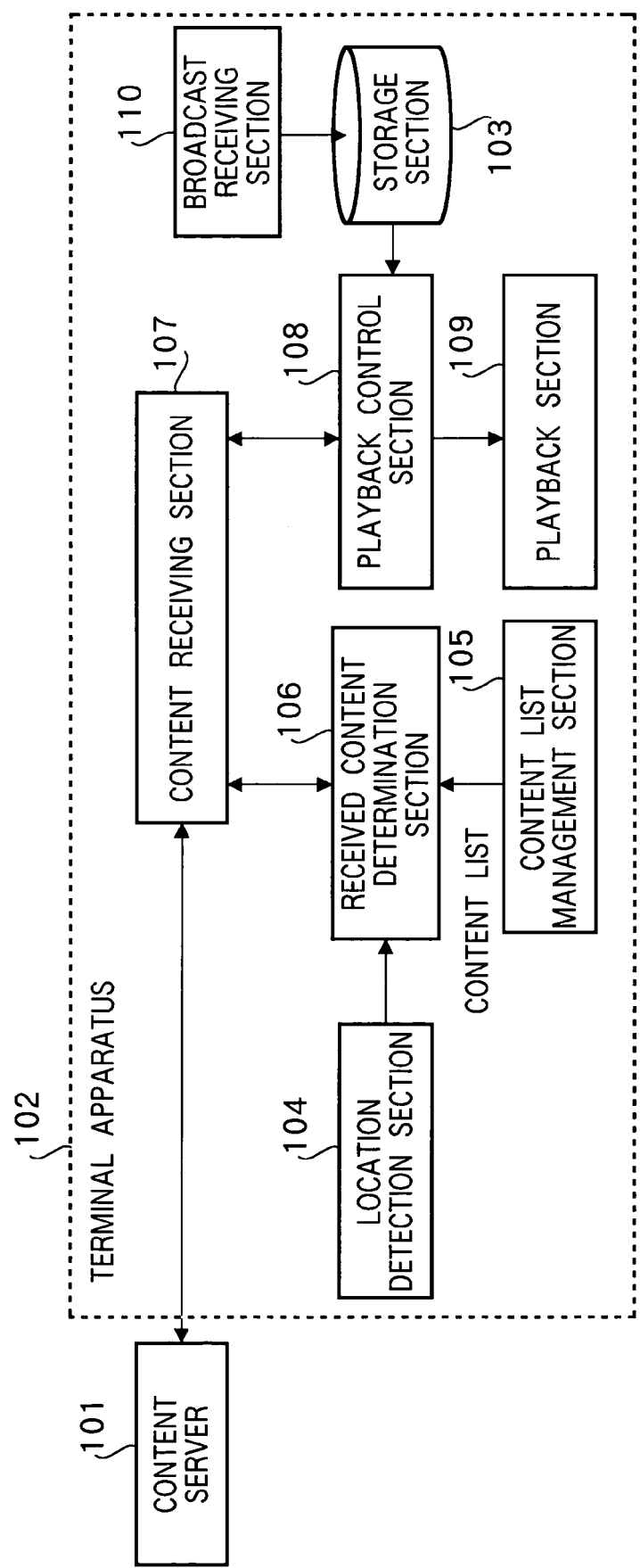
FIG. 5 is a configuration diagram of an information playback system equipped with a modified example of a terminal apparatus according to Embodiment 1.

Also, terminal apparatus 102 of this embodiment can be applied to not only stored content such as CD content, but also content that is broadcast (hereinafter referred to as "broadcast content"). FIG. 5 shows a sample configuration provided with a broadcast receiving section 110 required when terminal apparatus 102 is applied to broadcast content.

Broadcast receiving section 110 receives a TV broadcast or radio broadcast, and passes received broadcast contents to storage section 103. Storage section 103 stores these broadcast contents in the same way as stored content. Playback control section 108 extracts this broadcast content from storage section 103 using the same kind of procedure as for stored content stored in storage section 103, and has it played back by playback section 109. Thus, playback control section 108 plays back broadcast content by means of playback section 109 using the same kind of procedure as for stored content stored in storage section 103, and can also play back received content in intervals therein.

Figure 6:
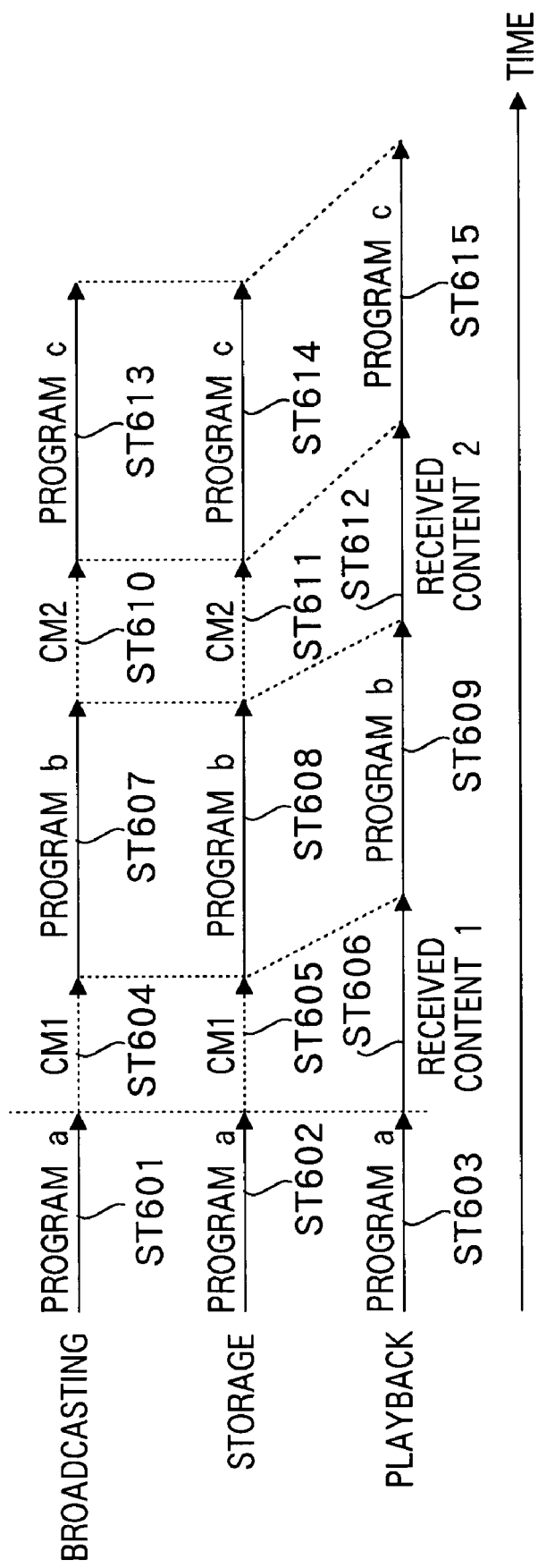
FIG. 6 is a drawing showing an example of the playback procedure for broadcast content and received content in a terminal apparatus according to Embodiment 1.

An example of the broadcast content and received content playback procedure in this terminal apparatus 102 will be described using FIG. 6. FIG. 6 is a drawing showing an example of the playback procedure for broadcast content and received content in this terminal apparatus 102.

In FIG. 6, content received by information playback system 100 is shown at the top, content stored by storage section 103 is shown in the middle, and content played back by playback section 109 is shown at the bottom. It is assumed that there is currently no content being played back by playback section 109. Also, program a, program b, and program c are assumed to be one program divided into three, and CM1 and CM2 are assumed to be CMs broadcast between program a and program b, and between program b and program c, respectively.

As shown in FIG. 6, when program a is received by information playback system 100 (ST601), this program a is stored in storage section 103 (ST602). As there is no content being played back by playback section 109, playback control section 108 instructs playback section 109 to play back program a. In accordance with this instruction, playback section 109 plays back program a (ST603).

When CM1 is received by broadcast receiving section 110 after program a (ST604), this CM1 is stored in storage section 103 (ST605). On detecting that the content stored in storage section 103 is CM content, playback control section 108 orders playback of received content received beforehand by content receiving section 107 (received content 1) instead of CM1. On receiving this instruction, playback section 109 plays back received content 1 (ST606).

When program b is received by broadcast receiving section 110 after CM1 (ST607), program b is also stored in storage section 103 in the same way as program a (ST608). However, as shown in FIG. 6, at the point at which storage of program b is started, playback section 109 is playing back received content 1. Therefore, playback control section 108 orders playback of program b stored in storage section 103 as soon as playback of received content 1 ends. In accordance with this instruction, playback section 109 performs playback of program b after the end of playback of received content 1 (ST609).

When CM2 is received by broadcast receiving section 110 after program b (ST610), CM2 is also stored in storage section 103 in the same way as CM1 (ST611). On detecting that the content stored in storage section 103 is CM content, as in the case of CM1, playback control section 108 orders playback of received content received beforehand by content receiving section 107 (received content 2) instead of CM2.

However, as shown in FIG. 6, at the point at which storage of CM2 is started, playback section 109 is playing back program b. Therefore, playback control section 108 orders playback of received content 2 as soon as playback of program b ends. In accordance with this instruction, playback section 109 performs playback of received content 2 after the end of playback of program b (ST612).

When program c is received by broadcast receiving section 110 after CM2 (ST613), program c is also stored in storage section 103 in the same way as programs a and b (ST614). However, as shown in FIG. 6, at the point at which storage of program c is started, playback section 109 is playing back received content 2. Therefore, playback control section 108 orders playback of program c stored in storage section 103 as soon as playback of received content 2 ends. In accordance with this instruction, playback section 109 performs playback of program c after the end of playback of received content 2 (ST615).

Thus, when this terminal apparatus 102 is applied to playback of broadcast content, even if the playback time of received content 1 is longer than a CM in an interval in broadcast content (a program), the broadcast content (program) broadcast after a CM is stored in storage section 103, and playback section 109 extracts and plays back this stored broadcast content (program). By this means, broadcast content is not missed even if content is played back based on terminal apparatus 102 current location information during intervals in broadcast content. Therefore, a user can view/listen to location-related content relating to the area around the current location while viewing/listening to broadcast content selected by the user himself or herself.

A case has been described in which, in terminal apparatus 102 according to this embodiment, received content determination section 106 determines received content based on information on the current location of terminal apparatus 102 detected by location detection section 104. However, an embodiment is desirable whereby, when received content determination section 106 determines received content, the time at which that received content will be played back (hereinafter referred to as "playback time of day") is predicted.

Figure 7:
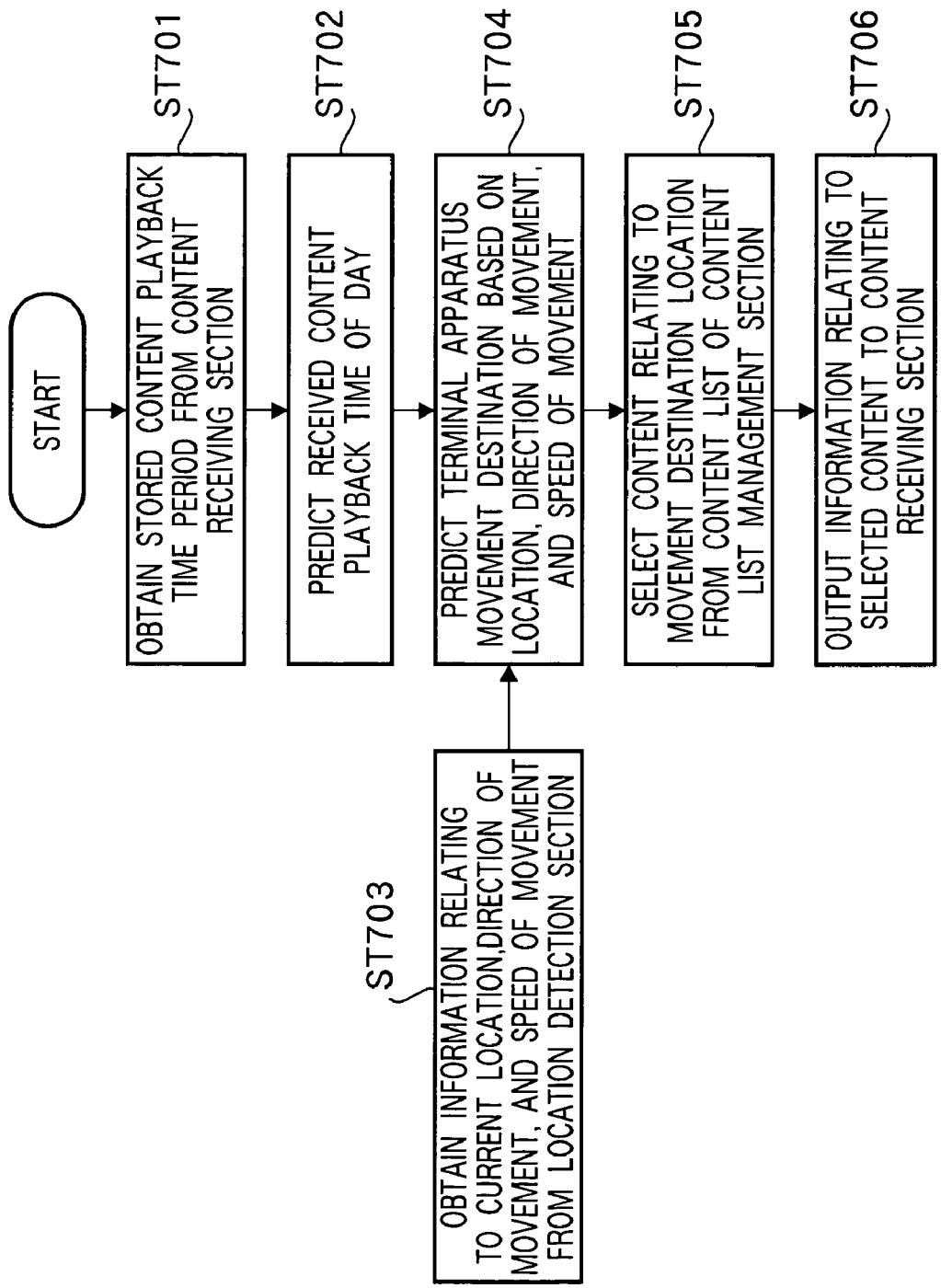
FIG. 7 is a flowchart for explaining the operation of a received content determination section when predicting the time at which received content is to be played back in a terminal apparatus according to Embodiment 1.

Specifically, the playback time of day of that received content can be predicted by considering the direction of movement and speed of movement of terminal apparatus 102, and the time required to play back stored content currently being played back (hereinafter referred to as "playback time period"). The operation of received content determination section 106 when the playback time of day of received content is predicted in this way is described below. FIG. 7 is a flowchart for explaining the operation of received content determination section 106 in this case.

When predicting the playback time of day of received content, the playback time period of the stored content being played back is reported to content receiving section 107 by playback control section 108. Received content determination section 106 obtains this stored content playback time period from content receiving section 107 (ST701).

On obtaining the stored content playback time period, received content determination section 106 predicts the playback time of day of received content based on this playback time period (ST702).

Meanwhile, received content determination section 106 obtains information relating to the current location, direction of movement, and speed of movement of terminal apparatus 102 detected by location detection section 104 (ST703).

On obtaining this information, received content determination section 106 predicts the destination location to which terminal apparatus 102 will have moved at the received content playback time of day predicted in ST702 based on this information (ST704).

After predicting the destination location, received content determination section 106 selects location-related content at that destination location from the content list of content list management section 105 (ST705).

Then, information relating to this selected location-related content is output to content receiving section 107 (ST706). On receiving the output information, content receiving section 107 receives the selected location-related content from content server 101, and outputs this content to playback control section 108.

When received content determination section 106 determines received content in this way, predicting the playback time of day of that received content enables the user of a moving terminal apparatus 102 to view/listen to location-related content relating to a destination location appropriately during intervals in stored content.

Embodiment 2

In a terminal apparatus 102 according to Embodiment 1, received content is determined in accordance with information relating to the location of terminal apparatus 102 detected by location detection section 104. A terminal apparatus 801 according to Embodiment 2 differs from terminal apparatus 102 according to Embodiment 1 in that received content is determined not only in accordance with information relating to the location of the apparatus, but also in accordance with attribute information such as keywords indicating the interests of a user.

Figure 8:
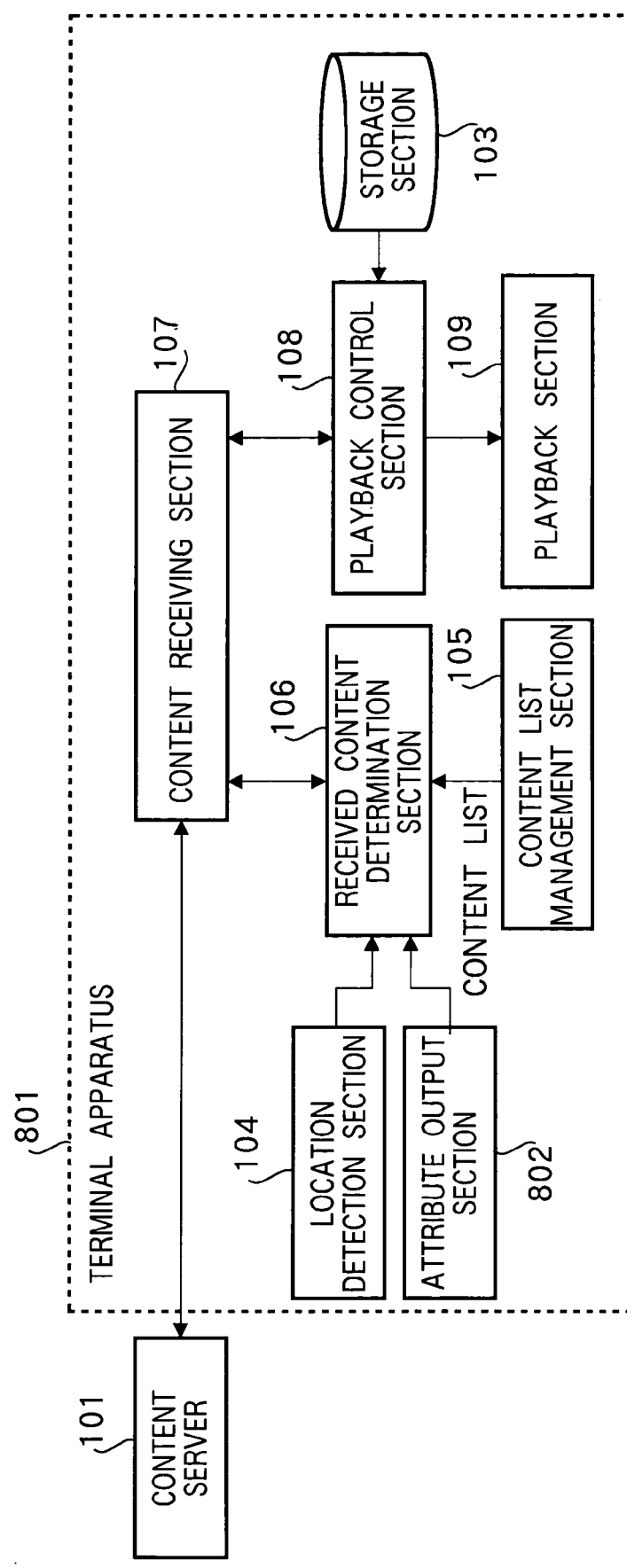
FIG. 8 is a configuration diagram of an information playback system equipped with a terminal apparatus according to Embodiment 2 of the present invention.

FIG. 8 is a configuration diagram of an information playback system equipped with a terminal apparatus 801 according to Embodiment 2. As shown in FIG. 8, terminal apparatus 801 according to Embodiment 2 differs from terminal apparatus 102 according to Embodiment 1 in having an attribute output section 802. Parts in FIG. 8 identical to those in FIG. 1 are assigned the same codes as in FIG. 1, and descriptions thereof are omitted.

Attribute output section 802 outputs attribute information comprising keywords such as "Restaurant" or "Sport" indicating the interests of a user, keywords deemed necessary by the user, and so forth, to received content determination section 106. These keywords may be recorded by the user beforehand. Also, attribute information may be recorded via extraction from a function provided in terminal apparatus 801 (such as a schedule management function, for example).

In a content list managed by content list management section 105 of terminal apparatus 801 according to Embodiment 2 are recorded keywords corresponding to address information and location information shown in FIG. 2 and suggesting the contents of that content.

FIG. 9 shows an example of the data structure of a content list managed by content list management section 105 of terminal apparatus 801 according to Embodiment 2. Parts in FIG. 9 identical to those in FIG. 2 are assigned the same codes as in FIG. 2, and descriptions thereof are omitted. As shown in FIG. 9, keywords 901 "Italian restaurant" are recorded in content 1 corresponding to the address information and location information. Similarly, the keywords "Sports goods" are recorded in content 2.

Based on location information from location detection section 104 and attribute information from attribute output section 802, received content determination section 106 determines location-related content that should be received from the content list managed by content list management section 105. For example, assuming that location information has been selected appropriately, if the location information is a keyword indicating an interest of the user, and that keyword is "Restaurant," content 1 shown in FIG. 9 is determined to be location-related content that should be received.

Keywords possessed by stored content may also be output to received content determination section 106 as attribute information. Examples of attribute information possessed by stored content may include text information such as lyrics of songs recorded on CD, or chapter information of video recorded on DVD. For example, it can be envisaged that, if a song being played back relates to "flowers," keyword "flowers" is extracted from the text information lyrics, and location-related content relating to flowers, such as content relating to florists, is received.

Thus, according to terminal apparatus 801 of Embodiment 2, location-related content that should be received is determined taking account not only of location information detected by location detection section 104, but also of attribute information such as keywords indicating the interests of a user. By this means, a user can, while viewing/listening to stored content selected by the user himself or herself, view/listen to location-related content matching his or her own interests from among location-related content of the current location during intervals in that stored content.

Received content determination section 106 may determine content that should be received based only on attribute information from attribute output section 802. In this case, it is possible to view/listen to content based only on a user's interests, regardless of location.

Embodiment 3

In a terminal apparatus 801 according to Embodiment 2, location-related content that should be received is determined and played back based on terminal apparatus 801 location information and also attribute information such as keywords indicating a user's interests. With a terminal apparatus 1001 according to Embodiment 3, a user can further select whether or not played-back location-related content is necessary.

Figure 10:
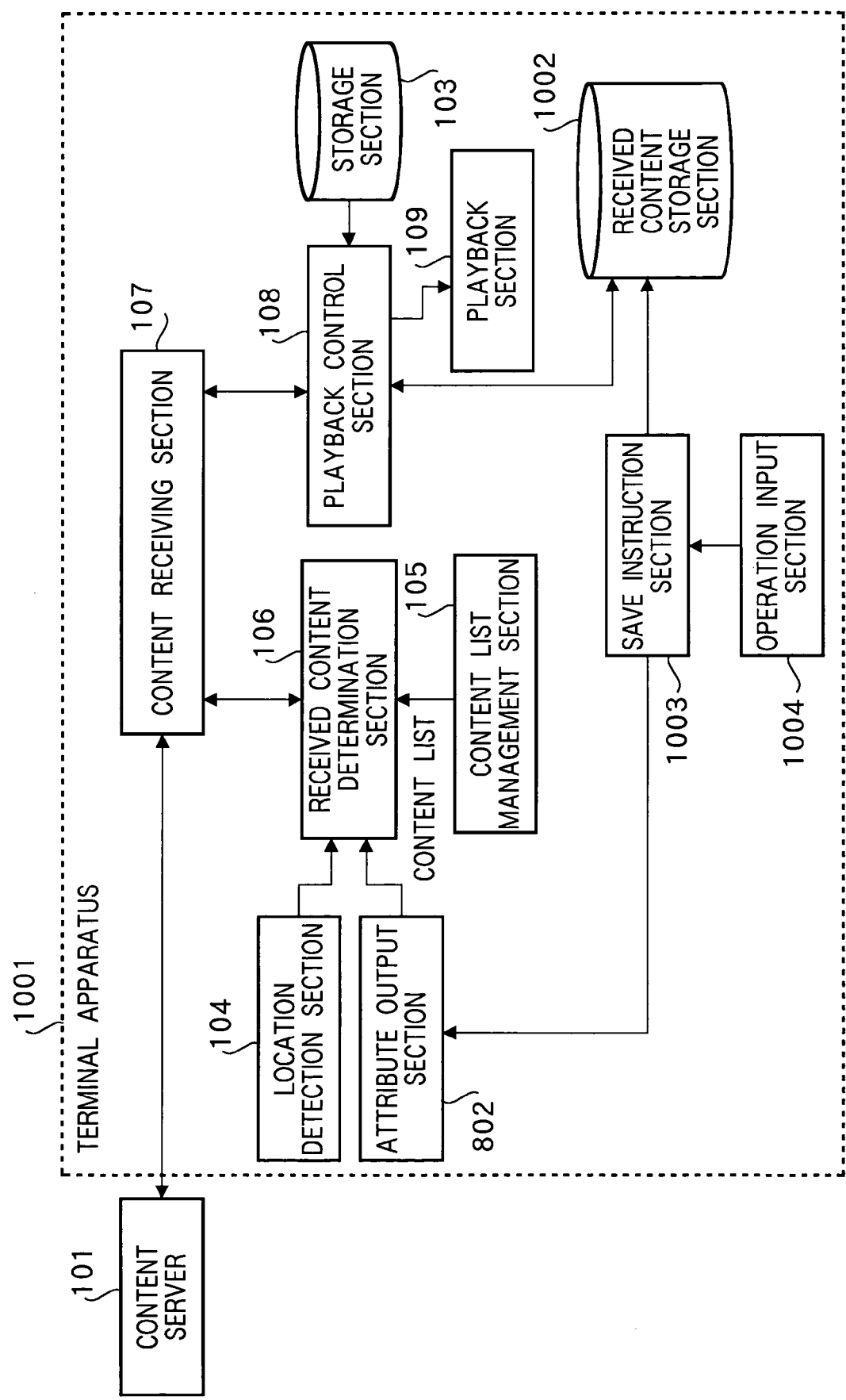
FIG. 10 is a configuration diagram of an information playback system equipped with a terminal apparatus according to Embodiment 3 of the present invention.

FIG. 10 is a configuration diagram of an information playback system equipped with a terminal apparatus 1001 according to Embodiment 3. As shown in FIG. 10, terminal apparatus 1001 according to Embodiment 3 differs from terminal apparatus 801 according to Embodiment 2 in having a received content storage section 1002, a save instruction section 1003, and an operation input section 1004. Parts in FIG. 10 identical to those in FIG. 8 are assigned the same codes as in FIG. 8, and descriptions thereof are omitted.

Received content storage section 1002 stores received content received by content receiving section 107 and played back by playback section 109. Played-back received content is temporarily stored in received content storage section 1002, and is saved or deleted in accordance with an instruction from save instruction section 1003 described later herein.

Storage of received content in received content storage section 1002 is determined in accordance with an instruction from save instruction section 1003. If a save instruction is input from save instruction section 1003, played-back received content is stored in received content storage section 1002. On the other hand, if a save instruction is not input, played-back received content is not stored in received content storage section 1002, but is deleted.

FIG. 11 shows an example of received content stored in received content storage section 1002. As shown in this FIG. 11, the following items are managed in received content storage section 1002 for each received content: date and time of reception 1101, category 1102, keywords 1103 indicating the contents, and actual data 1104.

Received content stored in received content storage section 1002 is played back again by playback section 109 under the control of playback control section 108. Playback control section 108 may play back stored receive data on receiving a user instruction, for example. An embodiment is desirable whereby, when a user selects received content in received content storage section 1002, a list of received content in received content storage section 1002 is displayed by playback section 109. The user selects received content in received content storage section 1002 by means of operation input section 1004 described later herein.

When a save instruction is input from save instruction section 1003 to received content storage section 1002, it can be determined that the user is interested in played-back received content. Therefore, in terminal apparatus 1001 according to Embodiment 3, keywords and the like contained in played-back received content are passed to attribute output section 802. At this time, save instruction section 1003 passes keywords corresponding to received content stored in received content storage section 1002 (keywords 1103 shown in FIG. 11) to attribute output section 802. These keywords, etc., are used as attribute information when determining received content.

An instruction output from save instruction section 1003 to received content storage section 1002 is output in accordance with a user input operation on operation input section 1004. That is to say, the user can specify via operation input section 1004 whether or not played-back received content is required.

Figure 12:
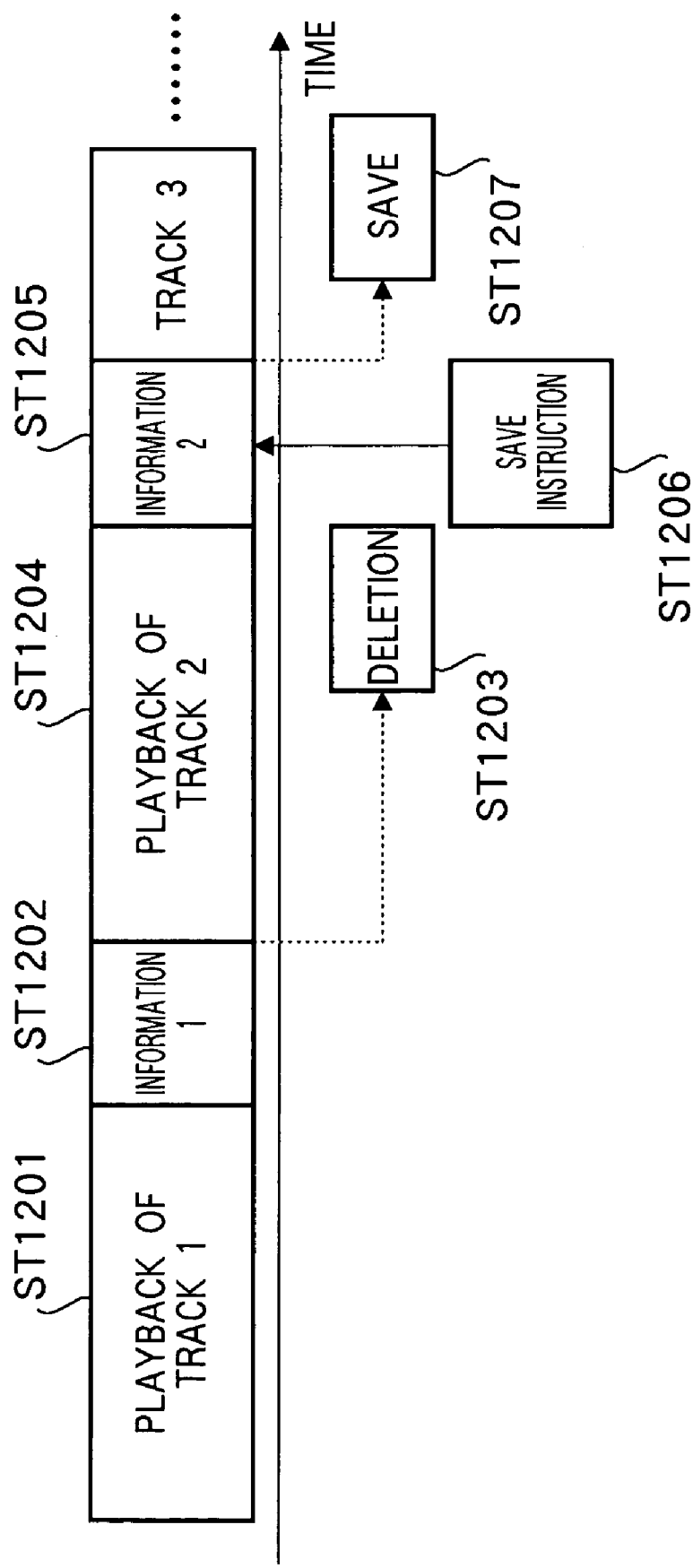
FIG. 12 is drawing showing an example of the processing procedure that saves or deletes location-related content played back during intervals in stored content in a terminal apparatus according to Embodiment 3.

An example of the processing procedure for saving or deleting received content played back during intervals in stored content in terminal apparatus 1001 will now be described using FIG. 12. FIG. 12 is drawing showing an example of the processing procedure that saves or deletes received content played back during intervals in stored content in terminal apparatus 1001.

In the example shown in FIG. 12, terminal apparatus 1001 plays back music data 1 (track 1) stored in storage section 103 by means of playback section 109 (ST1201) While track 1 is being played back, content receiving section 107 receives, as information 1, location-related content determined by received content determination section 106 based on location information detected by location detection section 104 and attribute information such as a keyword indicating the user's interests. This information 1 is then played back by playback section 109 after playback of track 1 ends (ST1202).

If the user shows interest in this information 1, the user can output a save instruction from save instruction section 1003 to received content storage section 1002 via operation input section 1004 while information 1 is being played back or immediately after playback. By this means, information 1 is saved in received content storage section 1002. However, in the example shown in FIG. 12, a case is shown in which there is no operational input from the user. That is to say, this is a case in which the user has not shown interest in this information 1. In this case, information 1 is determined to be information that is not necessary for the user, and is deleted after an arbitrary time period has elapsed (ST1203).

Meanwhile, after playback of information 1 ends, music data 2 (track 2) stored in storage section 103 is next played back (ST1204). While track 2 is being played back, information 2 is received using the same kind of procedure as when information 1 was received. Then this information 2 is played back after playback of track 2 ends (ST1205).

In the example shown in FIG. 12, information 2 is assumed to be information of interest to the user. Therefore, the user outputs a save instruction to received content storage section 1002 via operation input section 1004 while information 2 is being played back or immediately after playback (ST1206). In this case, information 2 is determined to be information that is necessary for the user, and is saved in received content storage section 1002 (ST1207).

It is desirable for the user operation on operation input section 1004 to be a simple operation. For example, it is desirable for a special button to be provided, and for a save instruction to be given simply by pressing that button.

The use of saved location-related content will now be described. It is assumed here that location-related content is information in which text information and audio information are combined. In addition to text written in HTML, text information may be a JPEG format or PNG format still image, for example. Text information might be an advertisement comprising information on the goods available in a store, for instance. This advertisement could include coupon information enabling special privileges such as a discount to be received on presentation to the store, point information whereby a discount amount is determined by a number of points, or electronic money allowing the purchase of goods or services according to a number of points. An example of audio information, on the other hand, is an audio advertisement for a store.

In the example shown in FIG. 12, music data in the form of stored content is played back, and therefore it is assumed that, of text information and audio information, only audio information is played back as information 1 and information 2. The user shows interest in information 2 audio information played back while stored content (music data) is being played back, and inputs a save instruction.

At this time, text information is also stored in received content storage section 1002 together with audio information. Thus, by referencing the saved information 2 audio information, the user can also play back text information together with that audio information. As a result, the user can play back via playback section 109 detailed advertising information, coupon information enabling special privileges to be received, and so forth, for a store of interest.

The use of coupon information enabling special privileges to be received will now be described. In this case, a possible procedure would be to show the storekeeper this coupon information displayed by playback section 109. By this means, the user can receive the discount or other special privilege indicated by the coupon information. However, this is not a limitation, and any method may be used that enables coupon information to be presented. For example, the user could output coupon information to an external printer or the like from terminal apparatus 1001 by a means such as radio communication, and present the output coupon information.

Thus, according to terminal apparatus 1001 of this embodiment, it is possible to save only necessary information from among received content played back during stored content. Then, by referencing saved received content after playback of stored content ends, for example, a user can, while viewing/listening to stored content, obtain useful information relating to the current location of terminal apparatus 1001, which is information relevant to the interests of the user, and can receive details of this information, special privileges, and so forth.

Embodiment 4

In terminal apparatuses according to Embodiments 1 through 3, content receiving section 107 receives content relating to the location of the apparatus from content server 101. A terminal apparatus 1301 according to Embodiment 4 differs in receiving broadcast content that is broadcast from a content broadcasting server 1302.

Figure 13:
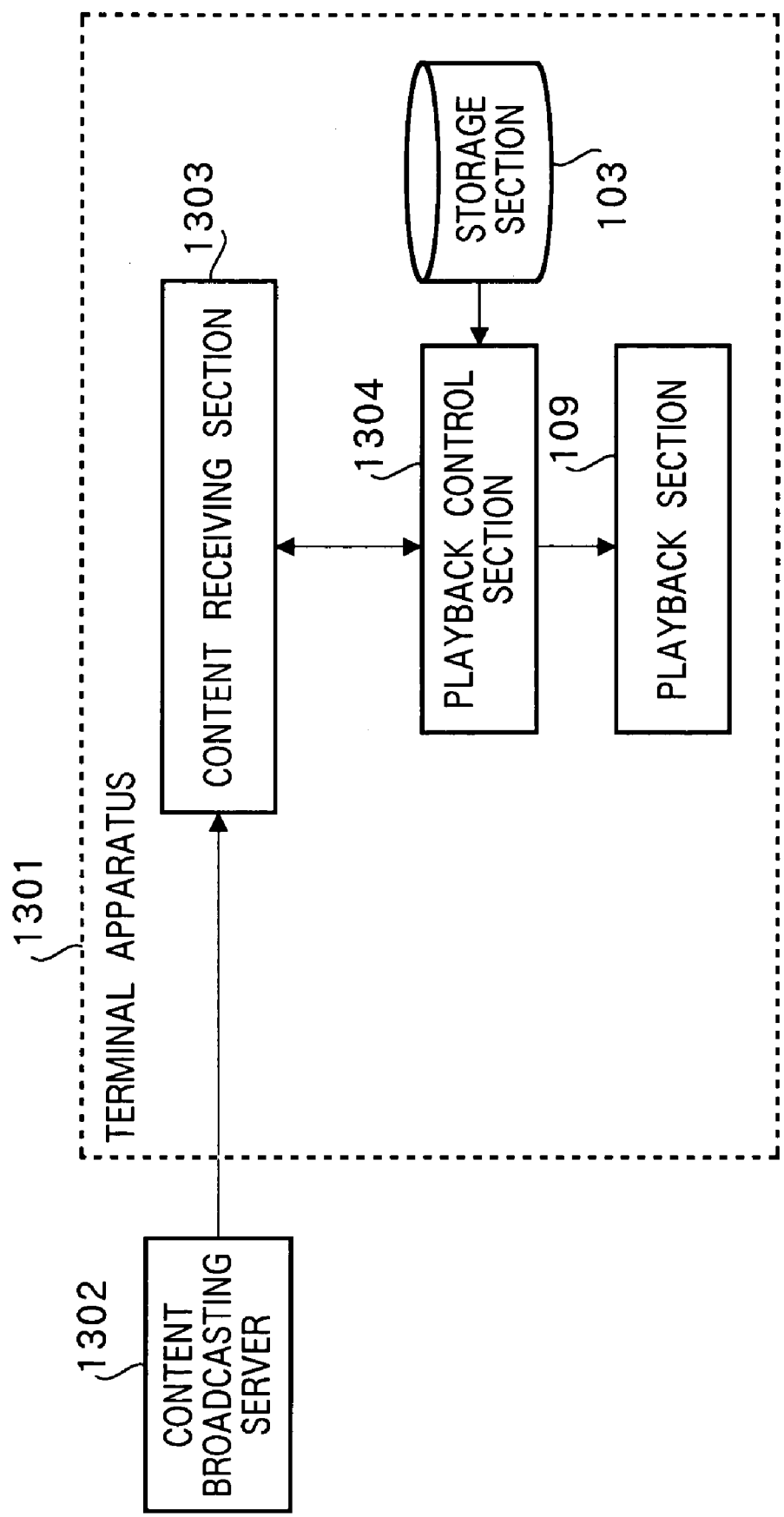
FIG. 13 is a configuration diagram of an information playback system equipped with a terminal apparatus according to Embodiment 4 of the present invention.

FIG. 13 is a configuration diagram of an information playback system equipped with a terminal apparatus 1301 according to Embodiment 4. As shown in FIG. 13, terminal apparatus 1301 according to Embodiment 4 differs from terminal apparatuses according to Embodiments 1 through 3 in having a content receiving section 1303 and playback control section 1304 in addition to storage section 103 and playback section 109. Parts in FIG. 13 identical to those in FIG. 1 are assigned the same codes as in FIG. 1, and descriptions thereof are omitted.

Content receiving section 1303 receives broadcast content from content broadcasting server 1302. Broadcasting media include radio transmission media such as infrared rays, and wire transmission media, as well as radio waves. As the broadcasting means, TV broadcasting, radio broadcasting, or other broadcast waves may be used, or broadcast or multicast methods using an Internet protocol may be used.

Playback control section 1304 switches between playback of broadcast content received by content receiving section 1303 and playback of stored content stored in storage section 103. More specifically, when content receiving section 1303 can receive broadcast content, that broadcast content is played back, and when content receiving section 1303 cannot receive broadcast content, stored content stored in storage section 103 is played back.

An example of a way of determining whether or not content receiving section 1303 can receive broadcast content is to make a "reception has become impossible" determination when channel quality such as the field strength or bit error rate is lower than a first set value for a first set time period or longer during reception of broadcast content, and to make a "reception has become possible" determination when channel quality exceeds a second set value for a second set time period or longer in a state in which broadcast content cannot be received. The first and second set time periods, and the first and second set values, respectively, may be the same or different. By setting the first and second set time periods to several seconds or more, for example, it is possible to prevent the frequent occurrence of playback switching within a short time under conditions in which there are momentary radio wave interruptions or the like.

Thus, according to terminal apparatus 1301 of this embodiment, when content receiving section 1303 can receive broadcast content, playback control section 1304 plays back that broadcast content by means of playback section 109, and when content receiving section 1303 cannot receive broadcast content, playback control section 1304 plays back stored content stored by storage section 103 by means of playback section 109. Therefore, when broadcast content received from content broadcasting server 1302 is being played back, and also when a situation arises in which broadcast content cannot be received, stored content can be played back as alternative content. As a result, a situation in which content playback is interrupted can be effectively prevented.

Embodiment 5

In terminal apparatus 1301 according to Embodiment 4, broadcast content that is broadcast from content broadcasting server 1302 is received indiscriminately. A terminal apparatus 1401 according to Embodiment 5 differs in selecting broadcast content that is broadcast from content broadcasting server 1302.

Figure 14:
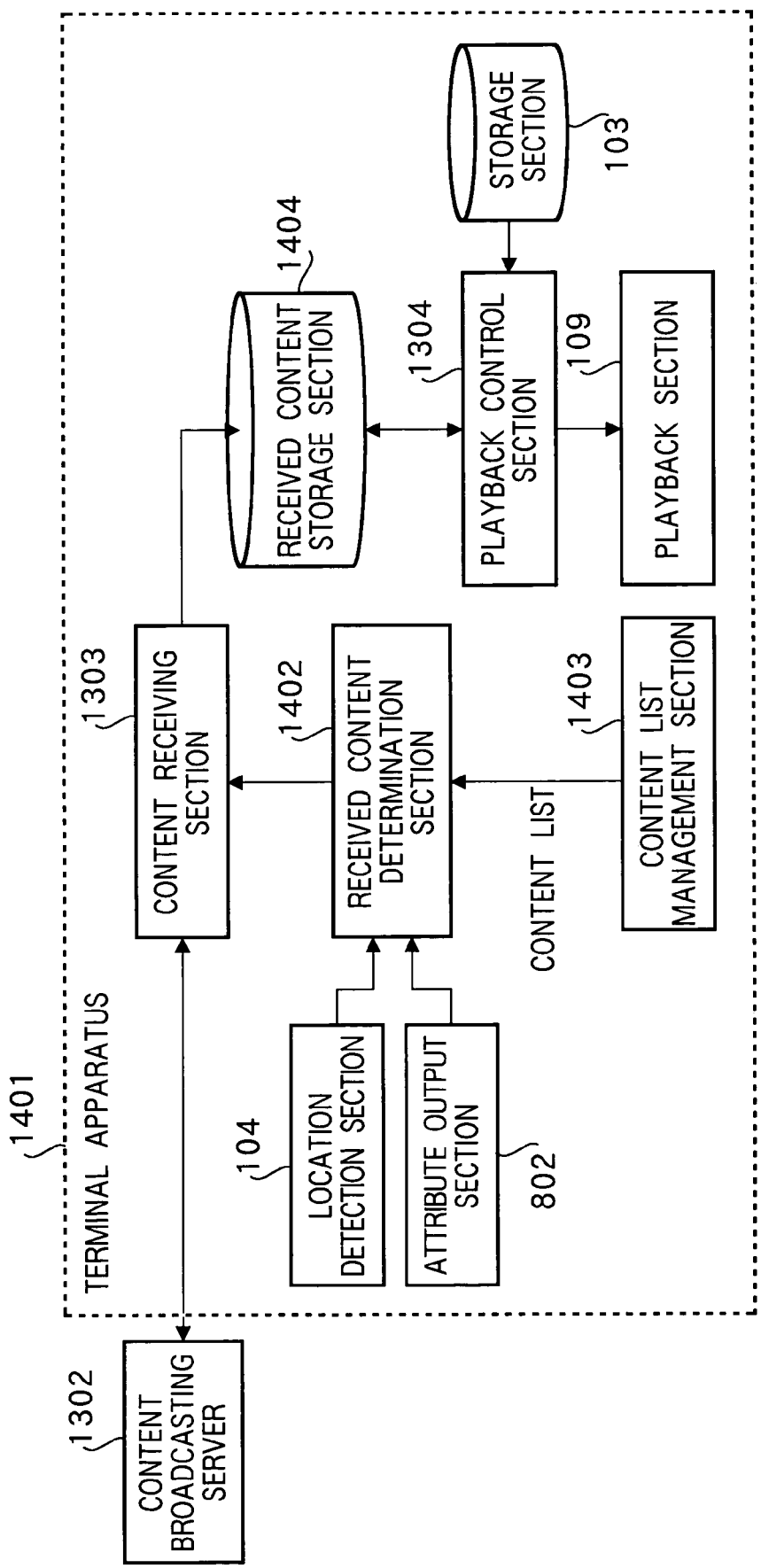
FIG. 14 is a configuration diagram of an information playback system equipped with a terminal apparatus according to Embodiment 5 of the present invention.

FIG. 14 is a configuration diagram of an information playback system equipped with a terminal apparatus 1401 according to Embodiment 5. As shown in FIG. 14, terminal apparatus 1401 according to Embodiment 5 differs from terminal apparatus 1301 according to Embodiment 4 in having a location detection section 104, an attribute output section 802, a received content determination section 1402, a content list management section 1403, and a received content storage section 1404. Parts in FIG. 14 identical to those in FIG. 1, FIG. 8, and FIG. 13 are assigned the same codes as in FIG. 1, FIG. 8, and FIG. 13, and descriptions thereof are omitted.

Received content determination section 1402 obtains at least one of current location information of the apparatus and user attribute information from at least one of location detection section 104 and attribute output section 802. Then broadcast content to be received by content receiving section 1303 is selected based on a content list managed by content list management section 1403.

In the content list managed by content list management section 1403, information is recorded that enables received broadcast content to be identified, such as channel information and time information concerning broadcast content broadcasting, for example.

Broadcast content received by content receiving section 1303 is stored in received content storage section 1404 as necessary. Storage of broadcast content in received content storage section 1404 is controlled by playback control section 1304. Playback control section 1304 plays back broadcast content received by content receiving section 1303 directly by means of playback section 109, and also stores broadcast content temporarily in received content storage section 1404 and then plays back that broadcast content by means of playback section 109.

Actual examples of various kinds of content played back by playback control section 1304 by means of playback section 109 in terminal apparatus 1401 according to this embodiment are described below.

For example, playback control section 1304 may play back received broadcast content when content receiving section 1303 is receiving broadcast content, play back broadcast content stored in received content storage section 1404 when content receiving section 1303 cannot receive broadcast content, and play back stored content stored in storage section 103 when neither can be played back. When content playback is controlled in this way, interruption of content playback can be prevented by playing back either broadcast content stored in received content storage section 1404 or stored content stored in storage section 103 even when broadcast content cannot be received.

Also, playback control section 1304 may play back stored content stored in storage section 103, and play back broadcast content stored in received content storage section 1404 in intervals therein. When content playback is controlled in this way, it is possible to detect the end of a track in music content or the end of a chapter in video content, for example, and play back stored broadcast content in the interim. By this means, a user can view/listen to the latest broadcast content in accordance with location and attributes while viewing/listening to stored content.

Thus, according to terminal apparatus 1401 of this embodiment, playback control section 1304 can select and have played back by playback section 109 any of broadcast content being received by content receiving section 1303, broadcast content stored in received content storage section 1404, or stored content stored in storage section 103. It is thus possible to switch between content to be played back according to the reception conditions and storage conditions of content currently being played back. As a result, a situation in which content playback is interrupted can be effectively prevented.

This application is based on Japanese Patent Application No. 2002-341099 filed on Nov. 25, 2002, and Japanese Patent Application No. 2003-386409 filed on Nov. 17, 2003, the entire content of which is expressly incorporated by reference herein.

INDUSTRIAL APPLICABILITY

As described above, according to the present invention it is possible to switch between playback of content received by means of broadcasting or communication, and playback of stored content stored in a storage medium, according to broadcasting or communication reception conditions, and the present invention is applicable to a mobile terminal or information playback apparatus, for example.

The invention claimed is:

1. A terminal apparatus comprising:
   a storage section that stores stored content;
   a content receiving section that receives content by broadcast or communication;
   a received content storage section that stores received content;
   a playback section that plays back said stored content or said received content;
   a playback control section that controls said playback section to switch between playing back said stored content and playing back said received content;
   a content list management section that manages a content list storing at least one or more combinations of an address of content relating to a location within a predetermined area, and said location;
   a location detection section that detects current location information; and
   a received content determination section that determines content that should be received from said content list based on said current location information;
   wherein said content receiving section receives content relating to a current location determined by said received content determination section; and
   said playback control section controls said playback section to switch between playing back said received content and playing back said stored content.

2. The terminal apparatus according to claim 1, wherein:
   said location detection section detects a direction of movement or speed of movement of an apparatus main unit; and
   said received content determination section predicts a playback time of day of content received by said content receiving section from a playback time period of content being played back by said playback section, and determines content relating to a movement destination location of an apparatus main unit at said predicted playback time of day to be content that should be received.

3. The terminal apparatus according to claim 1, further comprising an attribute output section that records attribute information indicating an interest of a user and outputs said attribute information to said received content determination section, wherein said received content determination section determines content that should be received from said content list based on said current location information and said attribute information.

4. The terminal apparatus according to claim 3, wherein part of information contained in stored content of said storage section is recorded in said attribute output section as said attribute information.

5. The terminal apparatus according to claim 1, further comprising a save instruction section that gives an instruction for saving or deletion of content of said received content storage section in accordance with an operational input of a user.

6. The terminal apparatus according to claim 5, wherein part of information contained in content for which there is a save instruction from said save instruction section is recorded in said attribute output section as said attribute information.

7. An information playback method comprising:
   receiving content by broadcast or communication;
   storing received content in a received content storage section;
   switching between playing back content stored in a content storage section and playing back the received content;

detecting current location information; and determining content that should be received from a content list storing at least one or more combinations of an address of content relating to a location within a predetermined area and the location, based on the current location information;

wherein content relating to the determined current location is received, and playback is switched between the received content and said stored content.

8. The information playback method according to claim 7, wherein, when current location information is detected, direction of movement or speed of movement of an apparatus main unit is detected, a playback time of day of content to be received is predicted from a playback time period of content of the storage section being played back, and content relating to a movement destination location of the apparatus main unit at the predicted playback time of day is determined to be content that should be received.

9. The information playback method according to claim 7, further comprising recording attribute information indicating an interest of a user, wherein, when content that should be received is determined, content that should be received is determined from the content list based on the current location information and the attribute information.

10. The information playback method according to claim 9, wherein part of information contained in stored content of the storage section is recorded as the attribute information.

11. The information playback method according to claim 7, further comprising giving an instruction for saving or deletion of content of the received content storage section in accordance with an operational input of a user.

12. The information playback method according to claim 11, wherein part of information contained in content for which there is a save instruction from a user is recorded as the attribute information.

* * * * *